(12) United States Patent
Feldtkeller et al.

(10) Patent No.: US 9,083,243 B2
(45) Date of Patent: *Jul. 14, 2015

(54) PROTECTION CIRCUIT FOR PROTECTING A HALF-BRIDGE CIRCUIT

(71) Applicant: INFINEON TECHNOLOGIES AUSTRIA AG, Villach (AT)

(72) Inventors: Martin Feldtkeller, Munich (DE); Dieter Zipprick, Huellhorst (DE)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 0 days.

This patent is subject to a terminal disclaimer.

(21) Appl. No.: 13/893,263

(22) Filed: May 13, 2013

(65) Prior Publication Data

US 2014/0159697 A1   Jun. 12, 2014

Related U.S. Application Data

(60) Continuation of application No. 13/406,416, filed on Feb. 27, 2012, now Pat. No. 8,441,240, which is a division of application No. 12/195,445, filed on Aug. 21, 2008, now Pat. No. 8,125,202.

(30) Foreign Application Priority Data

Sep. 18, 2007   (DE) .......................... 10 2007 044 483

(51) Int. Cl.
  *G05F 1/40*   (2006.01)
  *H02M 1/32*   (2007.01)
  *H02H 7/122*  (2006.01)

(52) U.S. Cl.
  CPC .............. *H02M 1/32* (2013.01); *H02H 7/1225* (2013.01)

(58) Field of Classification Search
  CPC .................................. G05F 1/40; G05F 1/562
  USPC ........... 323/268, 271, 282–285; 361/18, 91.1, 361/91.2, 93.7
  See application file for complete search history.

(56) References Cited

U.S. PATENT DOCUMENTS

| | | | |
|---|---|---|---|
| 5,973,943 A | 10/1999 | Ribarich et al. | |
| 6,331,755 B1 | 12/2001 | Ribarich et al. | |
| 7,099,127 B2 | 8/2006 | Chuang et al. | |
| 7,233,131 B2 | 6/2007 | Lin et al. | |
| 7,592,791 B2 * | 9/2009 | Emira ........................... | 323/283 |
| 2006/0034123 A1 | 2/2006 | Feldtkeller et al. | |
| 2007/0097578 A1 | 5/2007 | Bartolo et al. | |
| 2013/0188289 A1 * | 7/2013 | Misawa et al. ............... | 361/93.9 |

FOREIGN PATENT DOCUMENTS

| | | |
|---|---|---|
| DE | 102004009994 A1 | 9/2005 |
| DE | 102004037388 A1 | 3/2006 |
| EP | 1155492 B1 | 3/2004 |
| WO | 0233502 A1 | 4/2002 |
| WO | 2005083872 A1 | 9/2005 |

* cited by examiner

*Primary Examiner* — Matthew Nguyen
(74) *Attorney, Agent, or Firm* — SpryIP, LLC

(57) ABSTRACT

The present invention relates to a protection circuit for protecting a half-bridge circuit. The protection circuit detects an incorrect response of the half-bridge by monitoring the current of a first switch at a series resistor of a second switch. The protection circuit has a detector for detecting the voltage across the resistor and an evaluation circuit which is designed in such a manner that it evaluates an output signal from the detector after the first switch has been switched on and provides a fault signal at an output when the voltage across the resistor is greater than the threshold voltage.

15 Claims, 2 Drawing Sheets

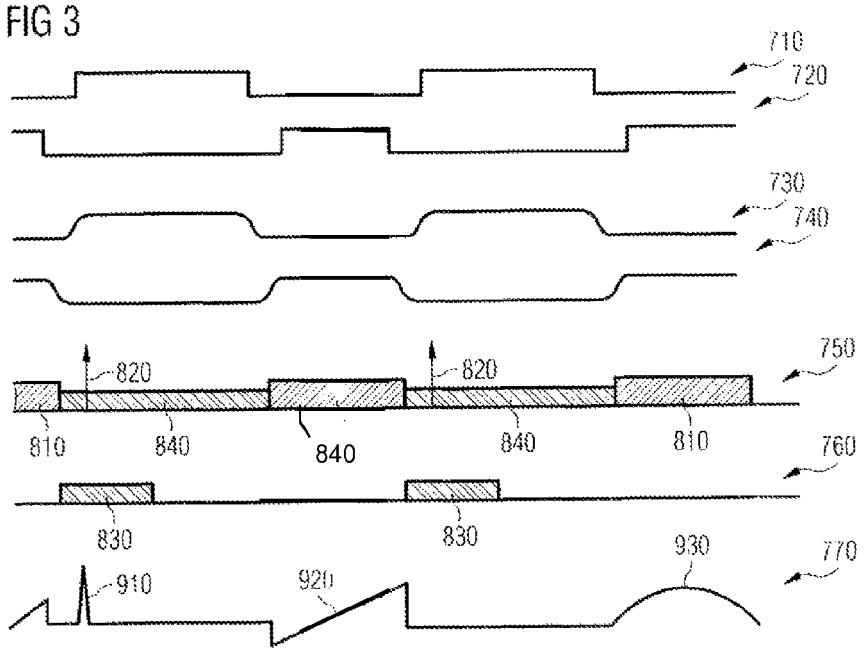

PROTECTION CIRCUIT FOR PROTECTING A HALF-BRIDGE CIRCUIT

RELATED APPLICATION

This Application is a Continuation of application Ser. No. 13/406,416, which was filed on Feb. 27, 2012. Application Ser. No. 13/406,416 is a Divisional Application of application Ser. No. 12/195,445, which was filed on Aug. 21, 2008 and issued as U.S. Pat. No. 8,125,202. The application Ser. No. 12/195,445 claims priority to German Application No. 10 2007 044 483 filed Sep. 18, 2007. The priority of each of the prior filed applications is claimed and the entire contents of the prior filed Applications are hereby incorporated by reference herein in their entirety.

FIELD OF INVENTION

The present invention relates to a protection circuit for protecting a half-bridge circuit. The protection circuit detects an undesirable operating mode of the half-bridge by monitoring a current of a first switch at a series resistor of a second switch.

BACKGROUND OF THE INVENTION

Half-bridges are used to switch loads to an upper supply voltage or to a lower supply voltage. In this case, a connection of the load is connected to a node which is common to the first and second switches. Half-bridges are used, for example, for motor control, for switched-mode power supplies and for lamp ballast circuits.

In order to avoid electromagnetic radiation emissions and to improve the switching response, so-called snubber arrangements are often inserted. The changing-over of the half-bridge from the first switch to the second switch and vice versa gives rise to the evolution of heat in the switches if the charge of capacitive loads is reversed. Such switching operations generally give rise to great switch-on losses in the switches involved. Therefore, the switches must be configured in such a manner that these switch-on losses in the switches can be converted into heat without destroying the switches in the process.

Switching losses can be reduced by means of so-called "zero voltage switching" (ZVS). Therefore, the switches of half-bridges which use zero voltage switching can be smaller and thus more cost-effective since these switches convert lower switching losses. If a half-bridge designed in this manner does not switch at the zero crossing, this is an undesirable operating mode of the half-bridge which must be detected so that measures which protect the switches of the half-bridge from thermal overloading can be initiated.

In particular in half-bridge circuits for lamp ballasts, the load of the half-bridge circuit is usually tuned in such a manner that it contains an inductive component. A capacitor (snubber) can be arranged in parallel with the half-bridge output. A dead time is inserted between the switched-on durations of the first and second switches. The dead time, capacitor and inductive component of the load current are usually tuned to one another in such a manner that the load current during the dead time suffices to reverse the charge of the capacitor. During the subsequent switch-on operation of a switch of the half-bridge circuit, the voltage of said switch is already zero, with the result that no switch-on losses occur. This operating mode is also referred to as "zero voltage switching" (ZVS).

If the inductive component of the load current does not suffice to completely reverse the charge of the capacitor, there is an incorrect response of the load. In this case, the voltage across the switch is not zero during the switch-on operation and the residual energy of the capacitor is converted into heat during the switch-on operation.

If the heat dissipation of the half-bridge switches is not designed for continuous non-zero-voltage switching operation, a circuit for detecting this operating state should be provided in order to switch off the half-bridge circuit, if necessary after a delay time. The delay time may be in the range from a few milliseconds to several seconds.

As a result of an incorrect response of the load, there are undesirable operating states in which the load current flows in the opposite direction during the dead time. Such an incorrect response of the load occurs, in the case of a lamp ballast circuit which normally operates in zero-voltage switching operation, for example when a lamp connected thereto is pulled from the holder or shattered during operation. In this case, the charge of the capacitor is not reversed and the load current flows during the dead time via the inverse diode of that switch of the half-bridge circuit which was switched off last. If the other switch of the half-bridge circuit is then switched on, this switch must not only convert the full amount of energy still stored in the capacitor into heat but must also eliminate the charge stored in the inverse diode of the switch which was turned off last. During the storage time, that switch of the half-bridge circuit which is just being switched on operates against a virtual short circuit to the full supply voltage. The heat loss produced in this case considerably exceeds the heat occurring during non-zero-voltage switching operation. This fault must be distinguished from the other faults since the half-bridge circuit must be switched off in a considerably more rapid manner. This fault is referred to below as hard commutation of the half-bridge circuit.

SUMMARY OF THE INVENTION

In one embodiment, a protection circuit for protecting a half-bridge circuit comprises a first switch adapted to be switched on at a switch-on instant for a switched-on duration, a second switch adapted to be switched on at another switch-on instant for a switched-on duration, a resistor in the current path of the second switch; a detector adapted to detect a voltage across the resistor, and an evaluation circuit configured to evaluate an output signal from the detector within an interval of time which includes the switch-on instant of the first switch and excludes the switched-on duration of the second switch.

In another embodiment, a protection circuit comprises first and second switches adapted to be periodically alternately switched on for a switched-on duration, and an evaluation circuit comprising a counting device adapted to count periodically recurring intervals of time during which a voltage across a resistor exceeds a threshold value at least once.

BRIEF DESCRIPTION OF THE DRAWINGS

Embodiments of the invention are explained in more detail below with reference to the drawings, in which:

FIG. 3 shows signal profiles.

DETAILED DESCRIPTION OF THE DRAWINGS

Figure 1:
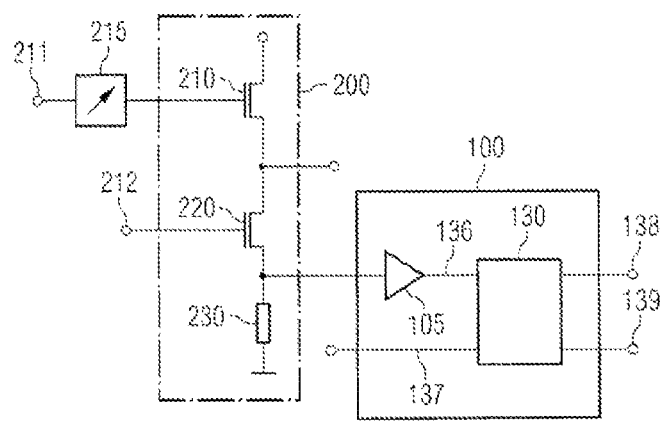
FIG. 1 shows an exemplary embodiment of a protection circuit for protecting a half-bridge circuit.

The present invention provides a protection circuit for protecting a half-bridge circuit, which protection circuit indicates an undesirable operating state of the half-bridge circuit.

The inventive protection circuit for protecting a half-bridge circuit having a first switch, a second switch and a resistor in the current path of the second switch, the first switch being switched on at a switch-on instant for a switched-on duration and the second switch being switched on at another switch-on instant for a switched-on duration, comprises a detector for detecting a voltage across the resistor and an evaluation circuit which is designed in such a manner that it evaluates an output signal from the detector within an interval of time which includes the switch-on instant of the first switch and excludes the switched-on duration of the second switch.

The inventive protection circuit for protecting a half-bridge circuit having a first and a second switch and a resistor in the current path of the second switch comprises a detector for comparing a voltage across the resistor with a threshold voltage and an evaluation circuit which is designed in such a manner that it evaluates an output signal from the detector within an interval of time and provides a fault signal at a first output when the voltage across the resistor is greater than the threshold voltage.

The first switch is switched on at a switch-on instant for a switched-on duration and the second switch is switched on at another switch-on instant for a switched-on duration.

The interval of time includes the switch-on instant of the first switch and excludes the switched-on duration of the second switch.

One advantageous refinement of the protection circuit for protecting a half-bridge circuit having a first and a second switch and a resistor in the current path of the second switch comprises a reference voltage source for providing a reference voltage, a comparator for comparing the voltage across the resistor with the reference voltage and an evaluation circuit which is designed in such a manner that it evaluates an output signal from the comparator while the first switch is being switched on and after the first switch has been switched on and provides a fault signal at a first output when the voltage across the resistor is greater than the reference voltage.

One advantageous refinement of a protection circuit for protecting a half-bridge circuit of a lamp ballast circuit having a first and a second switch and a resistor in the current path of the second switch comprises a reference voltage source for providing a reference voltage, a comparator for comparing the voltage across the resistor with the reference voltage and an evaluation circuit which is designed in such a manner that it evaluates an output signal from the comparator while the first switch is being switched on and after the first switch has been switched on and provides a fault signal at a first output when the voltage across the resistor is greater than the reference voltage.

One advantage of the protection circuit is that, in most cases, a current measurement path in the form of a shunt resistor and a connection to an integrated control circuit are provided anyway.

Another advantage is that only the profile of the current via the second switch of the half-bridge circuit is used. No additional costs are produced as a result.

A sufficient criterion for hard commutation is a large positive voltage drop across the resistor at the switch-on instant of the first switch of the half-bridge circuit.

During zero-voltage switching operation, the current through the second switch of the half-bridge circuit should be zero at this time. Even in non-zero-voltage switching operation, the voltage jump at the centre point of the half-bridge circuit, the common node of the first and second switches of the half-bridge circuit, gives rise to a voltage pulse across the resistor as a result of the junction capacitances of the second switch of the half-bridge circuit, the magnitude of said voltage pulse being at the detectability limit in most cases.

In contrast, in the case of hard commutation, voltage pulses whose magnitude is a multiple of the voltages occurring during normal operation are produced across the resistor. The cause is the charge which is stored in an inverse diode of the second switch and results in reverse recovery of the inverse diode. The flow of current through the first switch usually rises faster, during its switch-on operation, than the storage charge can be reduced. The result, at the switch-on instant of the first switch, is a large brief flow of current in the reverse direction through the inverse diode of the second switch and thus in a direction through the resistor connected in series with the second switch which corresponds to the current direction in the case of an active load on the half-bridge circuit.

A protection circuit which, with a low level of sensitivity, monitors positive current pulses in the second switch of the half-bridge circuit in temporal proximity to the switch-on instant of the first switch of the half-bridge circuit makes it possible to monitor hard commutation with a high level of interference immunity.

The protection circuit for protecting a half-bridge circuit having a first and a second switch and a resistor in the current path of the second switch checks whether the fault of hard commutation is present by virtue of the protection circuit reacting to short high current pulses through the second switch of the half-bridge circuit which has just been switched off, which current pulses occur in temporal proximity to the switch-on instant of the first switch of the half-bridge circuit.

In many cases, it should be assumed that, in the case of hard commutation of the load current from the first switch to the second switch, hard commutation of the load current from the second switch to the first switch is also carried out and vice versa. This relationship applies, in particular, to lamp ballasts on account of the symmetry properties of the load. Therefore, it is sufficient to only monitor the commutation from the second switch to the first switch, which takes place in temporal proximity to the switch-on instant of the first switch.

In one advantageous refinement, the interval of time begins when a control signal changes to a state which switches on the first switch. In this refinement, the period of time which begins the interval of time before the switch-on instant of the first switch is determined by signal propagation times. The signal propagation time is the period of time between a signal for switching on the switch of a control device and the actual switching-on of the switch.

In one advantageous refinement, the interval of time ends after the end of the switched-on duration of the first switch.

In another advantageous refinement, the interval of time ends after a predefined period of time after the switch-on instant of the first switch has elapsed.

One advantageous refinement of an evaluation circuit of the protection circuit for protecting a half-bridge circuit is designed in such a manner that it evaluates the output signal from the detector, within an interval of time which begins, at the latest, at the switch-on instant of the first switch and ends a predefined period of time after the switch-on instant of the first switch, and provides a fault signal at a first output when the voltage across the resistor is greater than the threshold voltage at least once within the interval of time.

This refinement checks whether the fault of hard commutation of a half-bridge circuit is present by virtue of the protection circuit reacting to short high current pulses through the second switch of the half-bridge circuit which has just been switched off. This refinement does not react to interference which does not arise in temporal proximity to the switch-on instant of the first switch of the half-bridge circuit. Therefore, this refinement is particularly suited to increasing the interference immunity to electromagnetic influence (EMC).

Another advantageous refinement of the evaluation circuit has a memory device for storing the fault signal and a second output for outputting the stored fault signal.

Another advantageous refinement of an evaluation circuit of the protection circuit for protecting a half-bridge circuit has a delay device for delaying the fault signal and a second output for providing the delayed fault signal. The ability of the protection circuit to withstand interference can be increased further by reacting only to a second fault in succession, for example.

Another advantageous refinement of an evaluation circuit of the protection circuit for protecting a half-bridge circuit has a counting device for counting the switch-on operations of the first switch with hard commutation of the second switch and a third output for providing a signal when the counting device exceeds a predefined count. The ability of the protection circuit to withstand interference can be increased further by reacting only to some faults in succession, for example. This refinement is particularly suitable for half-bridge circuits whose first and second switches are periodically alternately switched on for a switched-on duration and for evaluation circuits with a periodically recurring interval of time.

Another advantageous refinement of an evaluation circuit of the protection circuit for protecting a half-bridge circuit has a device for switching off the first and second switches on the basis of the fault signal or the counter reading.

Another advantageous refinement of an evaluation circuit of the protection circuit for protecting a half-bridge circuit has a switch-on signal input which is designed to receive a control signal for switching on the first switch.

Another advantageous refinement of the protection circuit has a device for switching off the first and second switches on the basis of the fault signal, the stored counter signal or the counted fault signal.

FIG. 1 shows a half-bridge circuit 200 having separate drive signals 211, 212 for the first and second switches of the half-bridge circuit. The drive signal 211 for the first switch of the half-bridge circuit is passed via a level converter 215. A detector 105 monitors the voltage drop across a resistor 230, which is in series with the second switch 220 of the half-bridge arrangement, for the exceeding of a threshold voltage. The detector may be in the form of an inverter, for example. The threshold voltage is then the changeover voltage of the inverter, for example. The output signal from the detector 105 is supplied to a first input 136 of the evaluation circuit 130. The drive signal 211 for the first switch of the half-bridge circuit may be supplied to a second input 137 of the evaluation circuit. Other signals which are connected with the operation of switching on the first switch may also be supplied to the second input. Signals which indicate, for example, the switch-on point of the first switch with a predefined lead time or a predefined delay time may be provided by a circuit which provides the drive signals for the two switches.

The evaluation circuit 130 checks whether the fault of hard commutation of the half-bridge circuit is present by evaluating the signal from the detector 105 within an interval of time which depends on a signal applied to the second input 137.

The interval of time comprises the switch-on point of the first switch and excludes the switched-on duration of the second switch. This interval of time may be restricted further inside the evaluation circuit. In one possible embodiment, the input for the drive signal for the first switch 211 is coupled to the second input 137 of the evaluation circuit 130. The rising edge of the signal at the second input 137 of the evaluation circuit 130 may indicate the switch-on point and the duration of the signal at the second input 137 of the evaluation circuit 130 may indicate a period of time during which the second switch is switched off. The evaluation circuit 130 may be designed in such a manner that it evaluates the signal 136 from the detector 105 only during an interval of time which begins after a state change of the drive signal 211, which switches on the first switch, and ends a predefined amount of time thereafter. This refinement does not react to interference from other interference sources which does not occur in temporal proximity to the switch-on instant of the first switch of the half-bridge circuit. Therefore, this refinement is particularly suitable for increasing the robustness to electromagnetic influence (EMC).

The evaluation circuit 130 may be designed in such a manner that it has a memory device for storing the fault signal. The stored fault signal may be led out at a first output 138.

The evaluation circuit 130 may be designed in such a manner that it has a counting device for counting hard commutation operations. The evaluation circuit may output a signal, for example at a second output 139, when the counting device has exceeded a predefined value. The ability of the protection circuit to withstand interference may be increased further by reacting only to some faults in succession, for example.

Figure 2:
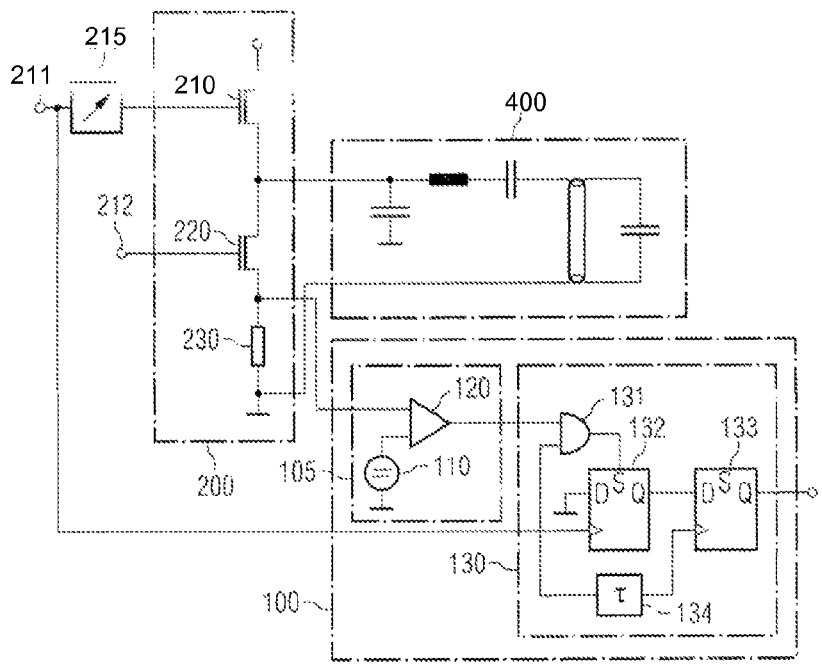
FIG. 2 shows another exemplary embodiment of a protection circuit for protecting a half-bridge circuit using the example of a lamp ballast arrangement.

FIG. 2 shows a half-bridge circuit 200 having separate drive signals 211, 212 for the first and second switches of the half-bridge circuit. The half-bridge circuit 200 drives a lamp arrangement 400 having a lamp. The drive signal 211 for the first switch of the half-bridge circuit is passed via a level converter 215. In this exemplary embodiment, the detector 105 is in the form of a comparator 120 having a reference voltage source 110. The comparator 120 monitors the voltage drop across a resistor 230, which is in series with the second switch 220 of the half-bridge arrangement, for the exceeding of a reference voltage 110. The output signal from the comparator 120 is logically combined with the drive signal 211 for the first switch 210 of the half-bridge circuit using a gate 131 and is supplied to the set input of a first flip-flop 132.

At the beginning of each switched-on duration of the first switch 210 of the half-bridge circuit, the first flip-flop 132 is reset in an edge-controlled manner. In the case of hard commutation, the comparator 120 switches shortly thereafter and sets the first flip-flop 132 again. Without hard commutation, the first flip-flop remains reset.

A second flip-flop 133 assumes the state of the first flip-flop in an edge-controlled manner after a short time delay. This has the advantage that the output of the second flip-flop 133 continuously indicates the fault during prolonged hard commutation, whereas the output of the first flip-flop 132 indicates the fault only with short interruptions. Furthermore, the evaluation of the output signal from the comparator is restricted to a short interval of time after the first switch of the half-bridge circuit has been switched on. Voltage spikes across the resistor 230 which occur outside the interval of time are not taken into account. If they occur, they cannot be associated with hard commutation but rather may have been caused by EMC interference.

FIG. 3 shows a plurality of signal profiles.

The first curve 710 shows an exemplary drive signal for the first switch, which can be provided at the input 211.

The second curve 720 shows an exemplary drive signal for the second switch, which can be provided at the input 212.

The third curve 730 shows an exemplary gate signal when the first switch is in the form of an N-channel MOS transistor.

The fourth curve 740 shows an exemplary gate signal when the second switch is in the form of an N-channel MOS transistor.

The fifth curve 750 shows an interval of time 840 which is suitable for the evaluation circuit.

The sixth curve 760 shows another interval of time 830 which is likewise suitable for the evaluation circuit.

The seventh curve 770 shows exemplary voltage profiles across the resistor 230.

The seventh curve 770 illustrates exemplary voltage profiles across the resistor 230. If the second switch is switched on, a profile 920 which rises in slightly rounded fashion is exhibited during the normal operating state of the half-bridge circuit. The current through the second switch is first negative and becomes positive during the switched-on duration.

One possible undesirable operating state is shown in the profile 930. In this case, for example, the current of the second switch is not positive at the end of the switched-on duration of the latter, which indicates a defective load.

The profile 910 shows a voltage spike, as occurs across the resistor 230 in the case of hard commutation. This high voltage spike occurs during the switch-on operation of the first switch. The instant 820 at which the voltage spike 910 occurs is marked in the fifth curve 750 and is within the evaluation interval 840.

The invention claimed is:

1. A method, comprising:
   periodically alternately switching first and second switches for a switched-on duration; and
   counting periodically recurring intervals of time during which a voltage across a resistor exceeds a threshold value at least once.

2. The method according to claim 1, further comprising outputting a fault signal whose state depends on a counter reading of the counting device.

3. The method according to claim 1, further comprising switching off the first and second switches on the basis of a stored fault signal or a counter reading of the counting device.

4. The method according to claim 1, wherein the switching act includes switching on the first switch during a first switched-on duration switching on the second switch during a second switched-on duration.

5. The method according to claim 1, wherein the resistor is in series with at least one of the switches.

6. The method according to claim 5, wherein the resistor is in series with the second switch.

7. The method according to claim 1, further comprising outputting a stored fault signal which indicates whether the voltage across the resistor is greater than the threshold value.

8. The method according to claim 1, further comprising detecting the voltage across the resistor.

9. A method, comprising:
   switching first and second switches for a switched-on duration; and
   counting at least one interval of time during which a voltage across a resistor exceeds a threshold value at least once.

10. The method according to claim 9, wherein the switching comprises switching the first and second switches during different switched-on durations.

11. The method according to claim 9, wherein the resistor is in series with the second switch.

12. The method according to claim 9, further comprising executing an evaluation process during a switched-on duration of the first switch.

13. The method according to claim 12, further comprising not executing an evaluation process during a switched-on duration of the second switch.

14. The protection circuit according to claim 9, further comprising outputting a stored fault signal which indicates whether the voltage across the resistor is greater than the threshold value.

15. The protection circuit according to claim 9, further comprising detecting the voltage across the resistor.

* * * * *